July 17, 1951  J. D. RYAN  2,560,599
BENDING MOLD AND METHOD OF PROLONGING THE LIFE THEREOF
Filed June 30, 1945  2 Sheets-Sheet 1

Inventor
JOSEPH D. RYAN.
By Frank Fraser
Attorney

July 17, 1951 J. D. RYAN 2,560,599
BENDING MOLD AND METHOD OF PROLONGING THE LIFE THEREOF
Filed June 30, 1945 2 Sheets-Sheet 2

Inventor
JOSEPH D. RYAN.
By Frank Fraser
Attorney

Patented July 17, 1951

2,560,599

UNITED STATES PATENT OFFICE 2,560,599

BENDING MOLD AND METHOD OF PROLONGING THE LIFE THEREOF

Joseph D. Ryan, Toledo, Ohio, assignor to Libbey-Owens-Ford Glass Company, Toledo, Ohio, a corporation of Ohio Application June 30, 1945, Serial No. 602,587

3 Claims. (Cl. 49—67)

The present invention relates to the treatment of bodies of glass or other materials at high temperatures, and has particular reference to the bending or shaping of heated sheets.

Briefly stated, this invention is based on the discovery that glass fibers, and specifically woven glass fibers or glass cloth, when combined with suitable fillers or impregnants, provides an ideal surface for contacting hot bodies, such as glass, without injury to or marring of heated and softened surfaces.

Generally speaking, glass sheets are bent commercially by one of two types of processes. In one, commonly called the horizontal type, the glass sheet is placed on a mold, usually of sand or iron, and the mold and sheet are both placed in a furnace and heated to the bending temperature of the glass. This is ordinarily around 1200 degrees Fahrenheit and at this temperature the glass sheet will gradually soften and sink by gravity until it comes in contact with, and completely conforms to, the shape of the bending surface of the mold. Under some circumstances a pressure member is used to assist the action of gravity in causing the sheet to take the exact form required. Glass sheets can be bent to practically any depth or degree of curvature by this method but it is relatively slow and laborious and does not lend itself to mass production.

The other method, usually called vertical bending is much faster but has heretofore been limited to the processing of relatively simple and shallow bends. In this method, a sheet of glass is first heated to the proper temperature while suspended vertically in a furnace. Then, while still supported vertically, the heated sheet is removed from the furnace and pressed to the desired predetermined curvature between a pair of oppositely disposed, complementary male and female pressure elements or shaping molds. These molds act like forming dies in that they are in engagement with the surfaces of the glass only momentarily. That is, just long enough to effect proper shaping of the sheet, the action being very much like that of a die stamping operation.

Because of the speed with which glass sheets can be bent by this method, and the fact that it readily adapts itself to a continuous operation, vertical bending has been extensively used in the commercial production of curved automotive glass. However, a special type of mold is required to produce satisfactory results. Molds that are made of metal, for example, or other materials that have a high thermal conductivity like graphite, carbon and so forth cannot be used to advantage because of their tendency to chill crack the glass. Plaster of Paris molds of the sort described and claimed in the patent to A. McK. Greaves-Walker, 2,330,279, granted September 28, 1943, have given very good results but even these are not adaptable to all conditions because there are definite limits to the temperatures and length of contact time that they can tolerate.

As a consequence, difficulty is experienced when these plaster molds are used to produce the deeper and more complicated bends such as are required in glazing proposed present day streamlined aircraft constructions, and automobiles of proposed post-war designs. This is because the plaster mass has a tendency toward calcination (breaking up and loss of bond) when exposed to high temperatures for any length of time.

The difficulty is particularly noticeable in the case of the male mold of the pair, because of the fact that the glass sheet is literally wrapped around the face of this mold during the bending operation, and is in contact with a greater area of its surface for a longer period of time than is the case with the female mold.

On extreme types of bends the male plaster mold will calcine to an extent that causes cracking or spalling of the mold surface and necessitates frequent mold replacement. This not only increases the cost of the operation by the cost of the new molds required but it also involves the factor of shut down time which means interrupted and lower production, and increased labor costs.

It is an aim of the present invention to provide a mold or shaping member, that can be adapted to either horizontal or severe vertical type bending, and which is equipped with a novel type of long lived contacting surface that will not mar or injure the heated surfaces of the glass during the shaping operation.

Another object is the provision of a contact member of this same general character, which can be used in other methods involving the molding or shaping of hot metal.

Another object is the provision of a combined glass fiber and plastic facing for such shaping members which will prevent deterioration of the members and/or chill cracking of the glass during use, by effectively insulating the shaping members from the heated metal being shaped.

Still another object is the provision of a new kind of contacting surface, particularly on a male shaping member, whereby deeper and more complicated bends can be produced more cheaply, rapidly, and accurately than heretofore, and whereby a finished bent glass sheet having smooth and parallel opposite surfaces of high quality is produced.

Other objects and advantages of the invention will become more apparent during the course of the following description, when taken in connection with the accompanying drawings.

In the drawings, wherein like numerals are employed to designate like parts throughout the same:

It has been pointed out above that the molds, mold facings, or shaping members of this invention have a wide field of usefulness in connection with the treatment of various kinds of heated bodies or surfaces. However, the application of the invention to the vertical bending of glass sheets is believed to be fully illustrative of its possibilities, and since this adaptation has already proved itself to be both a practical and a valuable one the invention will be specifically described in that connection here.

Figure 1:
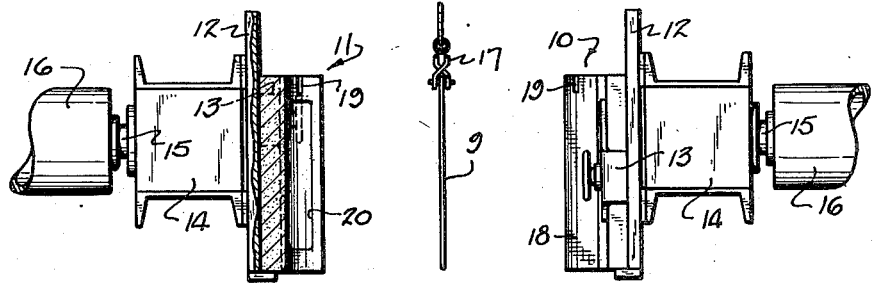
Fig. 1 is a side elevation, partially in section, of a heated glass sheet suspended between a pair of male and female bending molds just prior to the bending operation.

Referring now more particularly to the drawings, there is shown in Fig. 1 an apparatus intended for the vertical bending of glass sheets which includes male and female bending molds 10 and 11 respectively, mounted on suitable mold plates 12, by means of clamps 13. The mold supporting and carrying plates 12 are affixed to heads 14, mounted on plungers 15, operating in air cylinders 16 to move the molds 10 and 11 into and out of operative position.

In operation, a glass sheet 9 to be heated is supported in vertical position by suitable tongs 17, and after being heated to its softening point in a furnace is positioned between the oppositely disposed bending molds 10 and 11 in the manner shown in Fig. 1. By operation of the plungers 15 in the cylinders 16 the molds 10 and 11 are then brought into engagement with the opposite sides of the glass sheet, and press or bend it into the desired conformation therebetween.

According to this invention all of the calcining and chill cracking difficulties that have been encountered when using mold materials of low thermal conductivity like plaster of Paris, or of high thermal conductance such as metals, is overcome by the provision of a mold having a contacting or shaping surface of a glass fiber and filler combination. The glass fibers forming the mold surface should be very closely associated with one another and are preferably filled or impregnated with plastics or powdered inorganic materials. The most convenient form in which the fibers can be used is when woven together into glass cloth. In order to obtain the desired glass fiber shaping surface, the entire mold may be built of impregnated glass cloth by a suitable laminating procedure. Or, a facing of this material may be used on the surface of a mold that has a base or body portion of some other material.

For example, an impregnated glass fiber facing may be used on plaster of Paris molds or on molds of any of the other materials referred to above. In facing a mold a glass cloth laminate may be used, or loose sheets may be applied to the mold face and be subsequently coated, filled or impregnated after they are on the mold. In any event, when glass cloth is faced over a mold having a high thermal conductivity, its insulating properties cut down the flow of heat from the surface of the glass being pressed to such an extent that the body of the mold will not produce chill cracking. On the other hand when the impregnated glass cloth is placed over a plaster mold, which has a low thermal conductance but which calcines easily, the plaster base will be so insulated from the hot glass that its temperature will not be increased to the point where it undergoes any appreciable amount of calcination and therefore the mold will not crack or spall in use.

Furthermore, the glass cloth itself makes a surprisingly good mold or bending surface. Contrary to what might be expected the cloth, when made from small diameter fibers in reasonably close and tight weaves, does not mark the heated and soft glass surfaces. On the contrary molds faced with impregnated glass fibers are capable of producing bent glass sheets of sufficiently high quality to be used for automobile windshields, as well as for glazing the windows of vehicles.

The glass cloth that has thus far been found to be best suited for the purpose is one which is sold by the Owens-Corning Fiberglas Corporation as "ECC–11–116." Nevertheless it is believed that other specific types of glass cloth may prove to be as good, and in some cases even better. For instance, cloths wherein the warp and woof extend at angles other than right angles to each other are now being tested. It is felt that this sort of weave will give greater formability on the mold. That is, that the cloth can be stretched over shorter radii without increasing the number and size of the interstices between the fibers.

Figure 2:
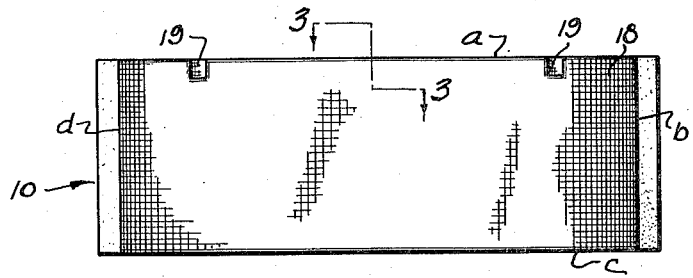
Fig. 2 is a front elevation of the male bending mold of Fig. 1.
Figure 3:
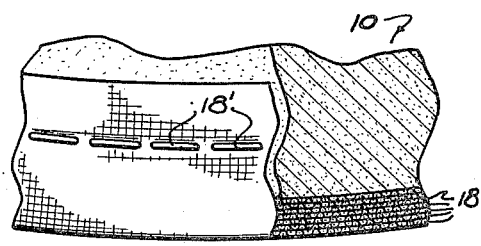
Fig. 3 is a fragmentary sectional view taken substantially along the line 3—3 in Fig. 2.
Figure 6:
Fig. 6 illustrates the building up of a glass cloth shaping member on a form.

Returning again to the disclosure in the drawings, the molds 10 and 11 of Fig. 1 are shown as being of plaster of Paris and the male mold 10 has its front or forming surface covered with a plurality of loose (that is, unlaminated) layers of glass cloth 18 (Figs. 1, 2 and 3). These layers of cloth are stretched over the mold surface, which has previously been produced in the same manner as for an unfaced mold, and are then secured in place by driving staples 18' through the marginal portions of the cloth and into the side edges of the mold. (Fig. 3.) In actual practice it has been found best to secure an adjacent long and short side of the cloth, as $a$ and $b$ (Fig. 2), to the mold edges first; then to staple the other long edge $c$, and finally the other short edge $d$. The cloth can also be cut and fitted into any necessary openings or depressions in the mold such as the slots 19 which are provided to receive the sheet supporting tongs during the bending operation.

The female mold 11 of the complementary pair 10 and 11 may also be faced with glass cloth if desired, although as indicated above the requirements for this mold are not so stringent because of the different way in which it contacts the glass sheet. As a matter of fact a regular, unfaced, plaster of Paris mold is usually entirely satisfactory for the female even under severe bending conditions. This is because this mold has only line contact with the glass until very nearly the end of the bending operation, and also because it can be cut out and relieved as indicated at 20, if desired, so that it will never have any more than marginal contact with the hot glass.

As a purely procedural proposition it is desirable, prior to facing the molds, to bake out the dextrine and other lubricants that are always present on commercial Fiberglas cloth. Even when this is not done these materials will eventually burn out in the first few pressings from contact with the hot glass, but there is some advantage to be found in baking them out prior to mounting the cloth on the mold because this reduces the tendency of the cloth to open up as it is stretched over the mold and in this way decreases the number and size of the interstices. The pre-baking can be done by heating the cloth to 450 degrees Fahrenheit for five to six hours. During heating the Fiberglas cloth, which is originally white, first turns a very light caramel color, but on continued heating its original white coloration is restored.

Figure 4:
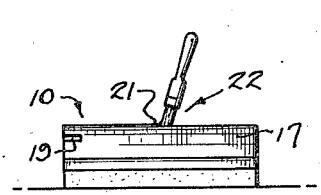
Fig. 4 is a diagrammatic illustration of one way in which a glass cloth faced mold may be treated with a plastic material.

As pointed out in the copending application of myself and William P. Bamford, Serial No. 602,586, filed June 30, 1945, now abandoned, molds that are faced in this manner, and with no further treatment, leave a surprisingly good surface on the bent glass sheets. However, according to this invention, the glass cloth is filled, after it is faced on the mold, with plastics or resins or other fillers such as finely powdered inorganic materials. Along with other advantages this filling further guards against the possibility of "printing" the weave of the cloth on the glass and, in some cases, permits the use of coarser weaves or heavier fibers.

Where resinous or plastic material is used to fill or impregnate the glass cloth it is only necessary to dissolve the impregnating substance in a suitable solvent and then brush or flow this solution 21 onto the cloth as illustrated at 22 in Fig. 4, after which the solvent is allowed to evaporate. Many types of plastics such as of phenol formaldehyde resin, urea formaldehyde resin and allyl resin, all of which are thermosetting plastics, may be used for this purpose. Or thermoplastic materials may be employed such as cellulose acetate, cellulose acetate butyrate, ethyl cellulose, polymethyl methacrylate resins, etc.

However, because of the high temperatures encountered on the mold surface as it contacts the hot glass, it is preferred that solutions of silicone resins, which materials are characterized by very high temperature stability, be employed. These silicone materials require temperatures of 150 to 200 degrees centigrade to cure them, but this curing can be readily effected in the present instance by simply allowing the resin in the impregnated cloth to cure as it contacts the surface of the hot glass being pressed.

The second type of impregnated glass fiber shaping surfaces referred to above, and which is produced by laminating layers of impregnated glass cloth into a preformed member of the desired shape, may be used either as a complete mold or to face a mold of other material.

One way in which this type of mold or mold facing can be made is illustrated diagrammatically in Figs. 5 to 10. A form 23 (Fig. 6) of the desired shape, and which can be made of glass, metal or other suitable material is first provided, and treated to prevent its shaped surface 24 from adhering to the material with which the glass cloth is to be impregnated. A layer of cellophane, which may be applied in sheet form or sprayed or otherwise coated on, is usually satisfactory for this purpose.

The number of layers of glass cloth required to give the desired thickness of laminate is then ascertained. Obviously this number will be greater when a complete mold is to be made than when it is only desired to produce a facing to be applied to a mold base. In choosing the particular kind of cloth to use the factors already enumerated of close weave and slender fibers should also be observed here.

The next step is to prepare a solution of the plastic that it is desired to use and to adjust its viscosity to proper working consistency. In the case of silicone resin, for example, this should be about 20 centipoises. One such resin that has proved to be very satisfactory for this purpose is sold in the trade under the name "Dow Corning No. 2101."

Figure 5:
Fig. 5 is a diagrammatic showing of a way in which separate pieces of glass cloth may be immersed in a resin solution.

As illustrated in Fig. 5, a layer of glass cloth is immersed in a solution of this resin 25, squeegeed as at 26 to remove excess solution, and then air dried at room temperature until the surface is still tacky, by which time the major portion of the solvent has been removed and evaporated. This layer of tacky cloth 27 is then laid over the form 23 (Fig. 6) and stretched to get good conformance with the surface contour. Successive layers 28 of the resin impregnated glass cloth are then built up on the form 23, sufficient squeegee pressure being applied each time, as indicated at 29 (Fig. 6), to eliminate air pockets between the plies. After building the laminate to the proper thickness the actual compositing step is carried out with the resin impregnated laminae still on the form.

Figure 7:
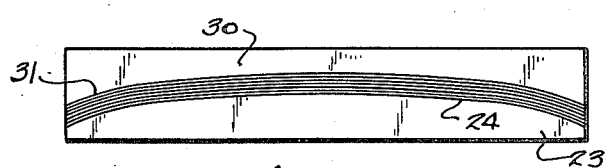
Fig. 7 illustrates the positioning of a second form on top of the built up glass cloth of Fig. 6, when it is desired to make a male shaping member.

If a female mold is being made the assembled layers of impregnated cloth can be laminated while in contact with the form 23. However, in making a male mold it is necessary to introduce a second form 30 having a concave surface 31 of exactly the same contour and finish that is desired on the convex bending surface of the completed mold. This form 30 is placed on top of the assembled laminations 25 with its finished surface 31, which has been treated to prevent sticking, in contact with the top laminae of the pile, as shown in Fig. 7. The assembly of forms and glass cloth laminae is then turned over and the form 23 removed.

The purpose of using different forms for the pressing of male and female molds is to have the face that is to become the bending face of the mold in each case in contact with a correctly finished surface during the pressing operation. This insures the contact face being of the proper contour and finish in the completed mold.

Figure 8:
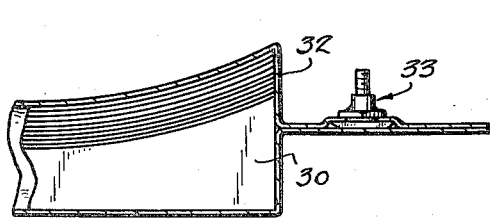
Fig. 8 shows the preliminary pressing of the built up glass cloth, while on the form, in a bag.
Figure 9:
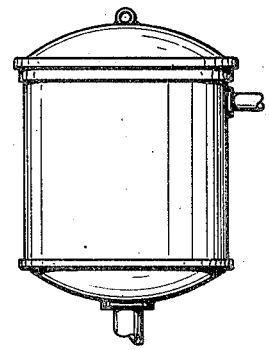
Fig. 9 is a view of an autoclave in which the final pressing of the assembled laminae on the form may take place.
Figure 10:
Fig. 10 is an end view of a completed laminated shaping member after it has been removed from the form.

With the layers of glass cloth in contact with the proper form, the entire assembly is then introduced into a cellophane bag 32 as shown in Fig. 8. The bag is then evacuated through the valve 33, after which it is put in an oil autoclave, illustrated in Fig. 9, and subjected to a temperature of 350 degrees Fahrenheit for a period of four hours at a pressure of 225 pounds per square inch. Following this treatment the structure is removed from the autoclave and bag and transferred to an oven (not shown) where it is given an additional heating at a slightly higher temperature (392 degrees Fahrenheit, for example) for one and one-half hours, to cure the resin.

Obviously, if other plastics, such as contact pressure resins, are employed for making the laminate, the procedure will be varied to conform to the laminating methods best suited to these materials and which are well known in the art.

As pointed out above, the finished shape of laminated glass cloth (Fig. 10) after being removed from the form 30 or 23, can be used as a complete mold; or it may be used as a mold facing in the same way as the loose cloth (shown in Figs. 3 and 4 and which is impregnated after it is on the mold). When the laminate is to be used as a complete mold it is clamped directly to the mold plate 12 (Fig. 1) by clamps similar to clamps 13, but which are modified to accommodate the particular mold structure.

Still another way to use the laminated glass cloth shape is to cast a backing of plaster of Paris, or some other material that is readily castable at reasonably normal temperatures, onto the rear surface of the laminae to form the full mold.

It is to be understood that the form of the invention herewith shown and described is to be taken as a preferred embodiment of the same, and that various changes in the shape, size and arrangement of parts may be resorted to without departing from the spirit of the invention or the scope of the subjoined claims.

I claim:
1. A plaster of Paris bending mold, a plurality of layers of glass cloth secured to the bending face of the mold, and a coating of a highly heat resisting plastic material on said glass cloth.

2. The method of prolonging the life of a perishable mold for use in bending glass sheets which comprises covering the bending surface of said mold with a combination of glass cloth with a highly heat resisting filler in the interstices of said cloth.

3. A female sheet bending mold comprising a shaping member having a generally concave bending face and its central portion cut out to provide for marginal contact only with the sheet to be bent, and a plurality of layers of glass cloth impregnated with a highly heat resisting plastic secured to the bending face of said shaping member.

JOSEPH D. RYAN.

REFERENCES CITED

The following references are of record in the file of this patent:

UNITED STATES PATENTS

| Number | Name | Date |
|---|---|---|
| 199,583 | Siemes | Jan. 22, 1878 |
| 1,889,881 | Thompson | Dec. 6, 1932 |
| 2,147,218 | Reimel | Feb. 14, 1939 |
| 2,167,318 | Verlay | July 25, 1939 |
| 2,189,840 | Simison et al. | Feb. 13, 1940 |
| 2,219,054 | Palm et al. | Oct. 22, 1940 |
| 2,279,630 | McMahon | Apr. 14, 1942 |
| 2,330,279 | Greaves-Walker | Sept. 28, 1943 |
| 2,404,904 | Collins | July 30, 1946 |

OTHER REFERENCES

Silicones, high polymeric substances, Modern Plastics, Nov. 1944, pages 124–126, 212 and 214, published by Modern Plastics, Inc., 20th and Northampton St., Easton, Pa.

The Silicones, a New Plastics Family, Plastics, Jan. 1945, of Chicago.